United States Patent
Hsu et al.

(10) Patent No.: US 7,447,273 B2
(45) Date of Patent: Nov. 4, 2008

(54) REDUNDANCY STRUCTURE AND METHOD FOR HIGH-SPEED SERIAL LINK

(75) Inventors: Louis L. Hsu, Fishkill, NY (US); Carl Radens, LaGrangeville, NY (US); Li-Kong Wang, Montvale, NJ (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 10/708,240

(22) Filed: Feb. 18, 2004

(65) Prior Publication Data

US 2005/0180521 A1    Aug. 18, 2005

(51) Int. Cl.
  *H01L 21/82*  (2006.01)
  *H01P 1/10*   (2006.01)

(52) U.S. Cl. .................. 375/295; 438/130; 438/131; 438/132; 333/262

(58) Field of Classification Search .......... 375/295
See application file for complete search history.

(56) References Cited

U.S. PATENT DOCUMENTS

| | | | |
|---|---|---|---|
| 4,811,275 A | 3/1989 | Balogh, Jr. et al. | |
| 5,369,642 A * | 11/1994 | Shioka et al. | 714/4 |
| 5,541,614 A | 7/1996 | Lam et al. | |
| 5,552,743 A * | 9/1996 | Manning | 327/567 |
| 5,638,946 A | 6/1997 | Zavracky | |
| 5,757,319 A | 5/1998 | Loo et al. | |
| 5,808,527 A | 9/1998 | De Los Santos | |
| 5,834,975 A | 11/1998 | Bartlett et al. | |
| 5,872,489 A | 2/1999 | Chang et al. | |
| 5,912,579 A | 6/1999 | Zagar et al. | |
| 5,943,223 A | 8/1999 | Pond | |
| 6,037,719 A | 3/2000 | Yap et al. | |
| 6,043,727 A | 3/2000 | Warneke et al. | |
| 6,049,702 A | 4/2000 | Tham et al. | |
| 6,069,587 A | 5/2000 | Lynch et al. | |
| 6,127,744 A | 10/2000 | Streeter et al. | |
| 6,131,169 A | 10/2000 | Okazawa et al. | |
| 6,143,997 A | 11/2000 | Feng et al. | |
| 6,160,230 A | 12/2000 | McMillan et al. | |
| 6,275,890 B1 | 8/2001 | Lee et al. | |
| 6,307,169 B1 * | 10/2001 | Sun et al. | 200/181 |
| 6,307,519 B1 | 10/2001 | Livingston et al. | |
| 6,310,339 B1 | 10/2001 | Hsu et al. | |
| 6,310,526 B1 | 10/2001 | Yip et al. | |
| 6,396,368 B1 | 5/2002 | Chow et al. | |

(Continued)

*Primary Examiner*—Shuwang Liu
*Assistant Examiner*—David Huang
(74) *Attorney, Agent, or Firm*—Joseph P. Abate; Daryl Neff

(57) ABSTRACT

An integrated circuit is provided having a plurality of data transmitters, including a plurality of default data transmitters for transmitting data from a plurality of data sources and at least one redundancy data transmitter. A plurality of connection elements are provided having a first, low impedance connecting state and having a second, high impedance, disconnecting state. The connection elements are operable to disconnect a failing data transmitter from a corresponding output signal line and to connect the redundancy data transmitter to that output signal line in place of the failing data transmitter. In one preferred form, the connection elements include a fuse and an antifuse. In another form, the connection elements include micro-electromechanical (MEM) switches. The connecting elements preferably present the low impedance connecting state at frequencies which include signal switching frequencies above about 500 MHz.

7 Claims, 5 Drawing Sheets

U.S. PATENT DOCUMENTS

| | | | |
|---|---|---|---|
| 6,470,125 B1 * | 10/2002 | Nashimoto et al. | 385/122 |
| 6,473,361 B1 | 10/2002 | Chen et al. | |
| 6,632,029 B1 * | 10/2003 | Williamson et al. | 385/92 |
| 6,711,046 B1 * | 3/2004 | Alter | 365/115 |
| 6,738,177 B1 * | 5/2004 | Gutierrez et al. | 359/298 |
| 6,819,197 B2 * | 11/2004 | Maldonado | 333/17.1 |
| 7,212,738 B1 * | 5/2007 | Wang | 398/2 |

* cited by examiner

REDUNDANCY STRUCTURE AND METHOD FOR HIGH-SPEED SERIAL LINK

BACKGROUND OF INVENTION

The present invention relates to data communications and more specifically to a structure and method for redundancy replacement in high-speed data communications circuitry.

Different types of systems are available today for providing high-speed data communications. Some systems require all communications to be transmitted using the same communication protocol layer stack. Other systems require communications to be transmitted at a particular transmission rate. The Unilink family of serializer-deserializer (SerDes) integrated circuits ("ICs" or "chips")cores offered by the assignee of the present invention, provides flexible choice over the communication protocol layer stack and the transmission rate.

Such SerDes cores chips have multiple adapters cores including data transmitters and receivers for integration into application specific integrated circuits ("ASICs" or "chips"). Chips containing SerDes cores typically include one or more additional functional elements, such as a processor. Each SerDes cores core supports multiple serial data links per chip as either unidirectionally (transmitting or receiving only) or bidirectionally (transmitting and receiving) configured chips. Unilink SerDes cores provide flexible design elements as they are integratable with other circuit block and functional element block libraries offered by the assignee of the present invention in complementary metal oxide semiconductor (CMOS) technology.

SerDes cores are intended primarily for providing chip-to-chip, and card-to-card interconnection, having transmitter and/or receiver units that operate at signal switching speeds above about 500 MHz, at data rates from above about 500 megabits per second (Mbs) up to many gigabits per second (Gbs). At such speeds, SerDes cores are utilized to replace a moderate rate parallel data bus with a single high-speed link. This significantly reduces the number of input output connections to and from the chip, simplifies system integration, and reduces overall system cost. In addition, SerDes cores are frequently used in groups of multiple links to achieve wider data paths, and consequently even higher data throughput.

The need for chips having high-speed SerDes cores increases as the demand for increased communication bandwidth and data processing speeds increases. FIG. 1 is a prior art diagram illustrating an environment 100 in which chips having SerDes cores are typically used. As shown in FIG. 1, a first SerDes core 150 is integrated into a chip mounted to a first card 110. The SerDes core 150 is shown having first and second transmitter blocks 130A and 130C, each having four transmitters, and first and second receiver blocks 130B and 130D, each having four receivers. Typically, SerDes cores include a large number of transmitters and receivers, for example, 128 pairs to 512 pairs of transmitters and receivers being available in one such core design. The SerDes core 150 forms a portion of a first chip which is mounted to a card 110 connected to a backplane 190 via a connector 170. At another position of the backplane 190, a second card 120 is connected via connector 171, the card 120 also having a SerDes core 160 integrated on a chip mounted thereto. Like SerDes core 150, the SerDes core 160 is shown having first and second transmitter blocks 140B and 140D and first and second receiver blocks 140A and 140C. In such arrangement, a transmitter of the transmitter block 130A of the SerDes core 150 transmits data in a first direction over a cable 182 of the backplane 190 to a receiver of the receiver block 140A of the SerDes core 160. A transmitter of transmitter block 140B of SerDes core 160 transmits data in a second direction (return direction) over another cable 180 to a receiver of receiver block 130B of SerDes core 150.

As mentioned above, in the environment 100 (FIG. 1) 128 pairs of high-speed data receivers and data transmitters are provided in each SerDes core of a custom chip. Given the operational performance required from each transmitter and receiver, and the number of receivers and transmitters provided in each chip having a SerDes core, it is likely that one or more receivers and transmitters on a chip will fail at some time, either during post-production testing or later when installed for use. As the number of receivers and transmitters per chip is increased, the likelihood that a receiver or a transmitter will fail increases further. At present, the response to such failure is to declare the entire chip unusable and to scrap the chip, even though the failing transmitter or receiver is only a small part of the chip, and many other transmitters and receivers remain in working order. One need of the SerDes core design is to provide a structure and method for replacing transmitter or receiver elements with an available redundancy transmitter or a redundancy receiver.

A redundancy replacement arrangement used in a memory array according to the prior art is illustrated in FIG. 2. As shown in FIG. 2, input signal lines di1 through di4 are coupled by a set of multiplexers 10, 20, 30, and 40 to output signal lines do1 through do4. A redundancy input line rdi is also coupled to each of the multiplexers 10 the redundancy input line rdi being coupled to a redundancy data transmitter or redundancy data receiver. Each multplexer is implemented by an inverter, a pair of transmission gates and a pair of redundancy transmission gates, all implemented by complementary metal oxide semiconductor field effect transistors (CMOSFETs). For example, multiplexer 20 is implemented by an inverter (INV2), a pair of transmission gates T21, and a pair of redundancy transmission gates T22. When upstream devices (not shown) that are connected to the input signal lines di1-di4 are operational, the control inputs c1 through c4, being at normally inactive states, select the input signal lines for connection to the output signal lines do1 through do4. However, when an upstream device is not operational, one of the control inputs is activated, such that the multiplexer to which it is attached selects the redundancy input signal line rdi instead. For example, when control signal c2 is active (at a high voltage state), the multiplexer 20 selects the redundancy input line rdi for output to the output signal line do2 in place of the input signal line di2.

While the prior art arrangement shown in FIG. 2 performs acceptably within a memory array, two problems of the prior art arrangement of FIG. 2 make it unsuitable for use in high-speed SerDes cores operating at signal switching speeds above about 500 MHz. First, the MOSFETs used as transmission gates of the default signal path, for example gates T21 of multiplexer 20, introduce jitter noise which restrains the bandwidth of the signals passed from input signal lines dil-di4 to dol-do4. Second, the redundancy signal path from redundancy signal line rdi to output signal line suffers from high parasitic junction capacitance. The redundancy signal line rdi is connected to all redundancy transmission gates, i.e. gates T12, T22, T32 and T42, such that all of the MOSFETs of the transmission gates contribute to the parasitic junction capacitance. Such parasitic junction capacitance reduces the transmission bandwidth of signals on the redundancy signal input line rdi even more so than the jitter noise caused by the transmission gates of the default signal path. Both of these problems make redundancy replacement arrangements using MOSFET transmission gates unsuitable for signal switching speeds above about 500 MHz.

Therefore, it would be desirable to provide a redundancy replacement arrangement for a high-speed communications circuitry adapter. It would further be desirable to provide a redundancy replacement arrangement suitable for high speed communications circuitry operating above about 500 MHz.

It would further be desirable to provide a redundancy replacement arrangement having increased bandwidth relative to those in which MOSFET transmission gates are utilized.

SUMMARY OF INVENTION

An integrated circuit is provided having a plurality of data transmitters operable at signal switching frequencies above about 500 MHz, including a plurality of default data transmitters for transmitting data from a plurality of data sources and at least one redundancy data transmitter. A plurality of connection elements are provided having a first, low impedance connecting state at frequencies above about 500 MHz and having a second, high impedance, disconnecting state. The connection elements are operable to disconnect a failing data transmitter from a corresponding output signal line and to connect the redundancy data transmitter to that output signal line in place of the failing data transmitter. The connection elements preferably include a fuse and an antifuse. In another form, the connection elements include microelectromechanical (MEM) switches.

DETAILED DESCRIPTION

Figure 1:
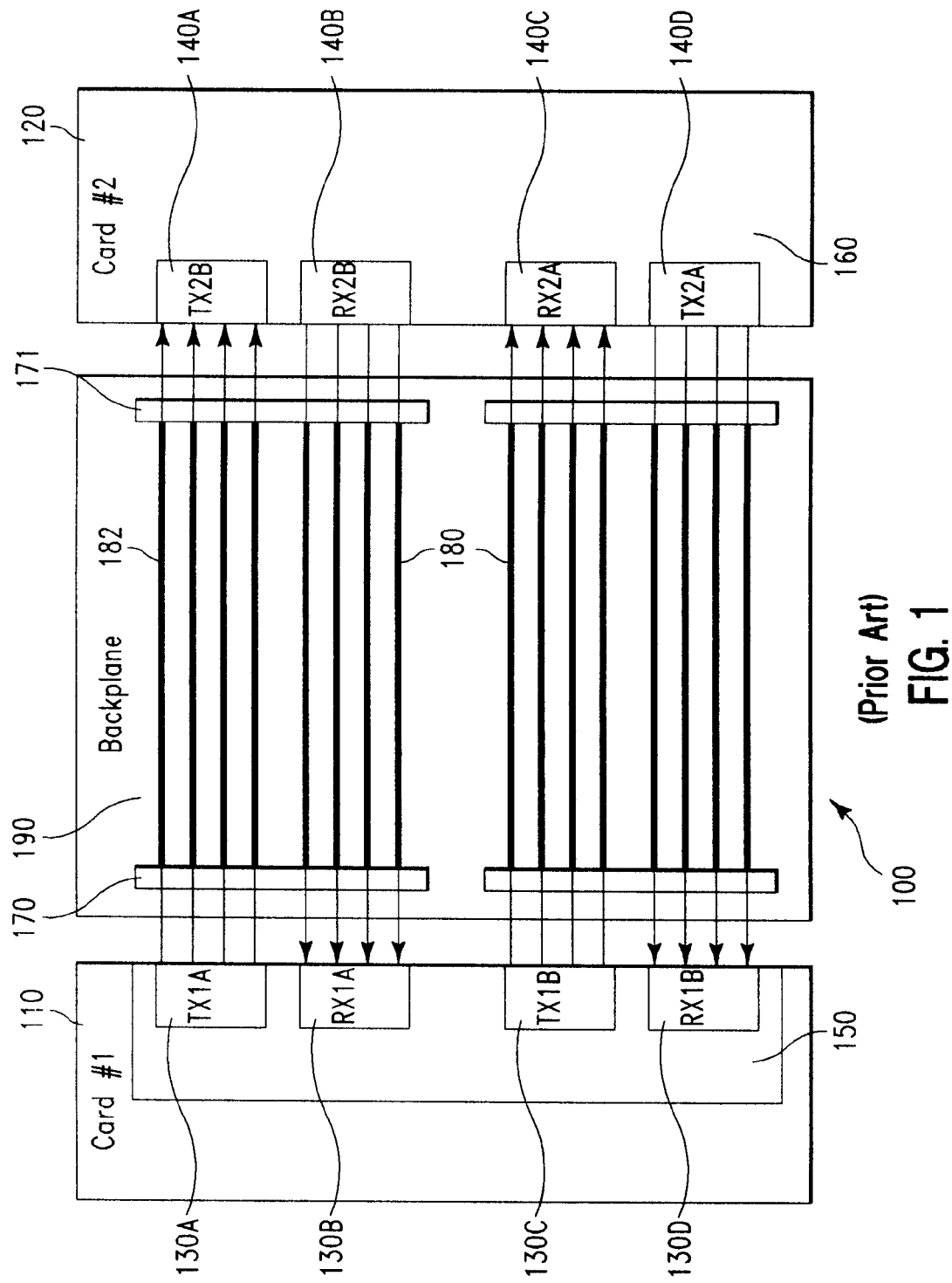
FIG. 1 is a prior art diagram illustrating an environment 100 in which chips having SerDes cores are typically used.
Figure 3:
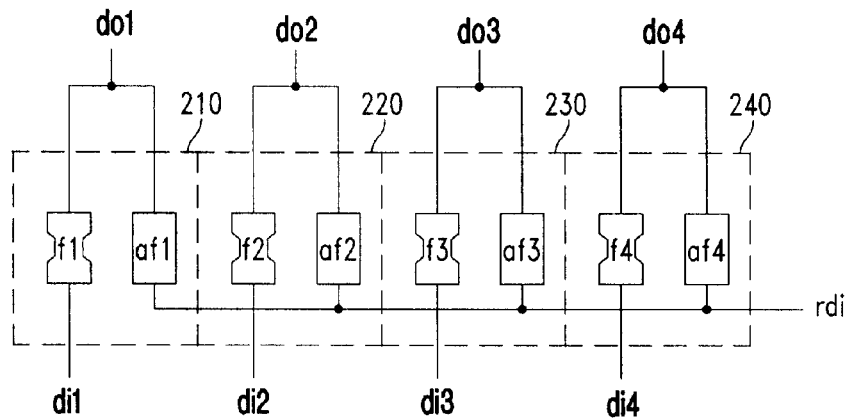
FIG. 3 is a schematic diagram of a redundancy replacement arrangement according to a preferred embodiment of the invention.

FIG. 3 is a schematic diagram of a redundancy replacement arrangement according to a first preferred embodiment the invention. In such embodiment, a plurality of input signal lines di1 through di4 are connected to outputs of individual transmitters of one of the transmitter blocks 130A or 130C (FIG. 1). In the embodiment shown in FIG. 3, a plurality of connection elements 210, 220, 230 and 240 are provided, each having a fuse and an antifuse, for connecting the input signal lines di1 through di4 to corresponding ones of the output signal lines do1 through do4. Thus, by default, transmitters of a transmitter block 130A or 130C, which are connected to the input signal lines di1 through di4, are normally connected by a set of corresponding fuses f1, f2, f3, and f4 to the output signal lines do1 through do4. A fuse initially presents low impedance. Upon application of sufficient electrical conditions, the fuse is blown, which changes the fuse to a highly resistive, high impedance state. For example, a fuse programming voltage is applied between an output signal line, e.g. do3, and the input signal line di3 to blow the fuse f3, severing the connection between the input signal line di3 and the output signal line do3.

Figure 2:
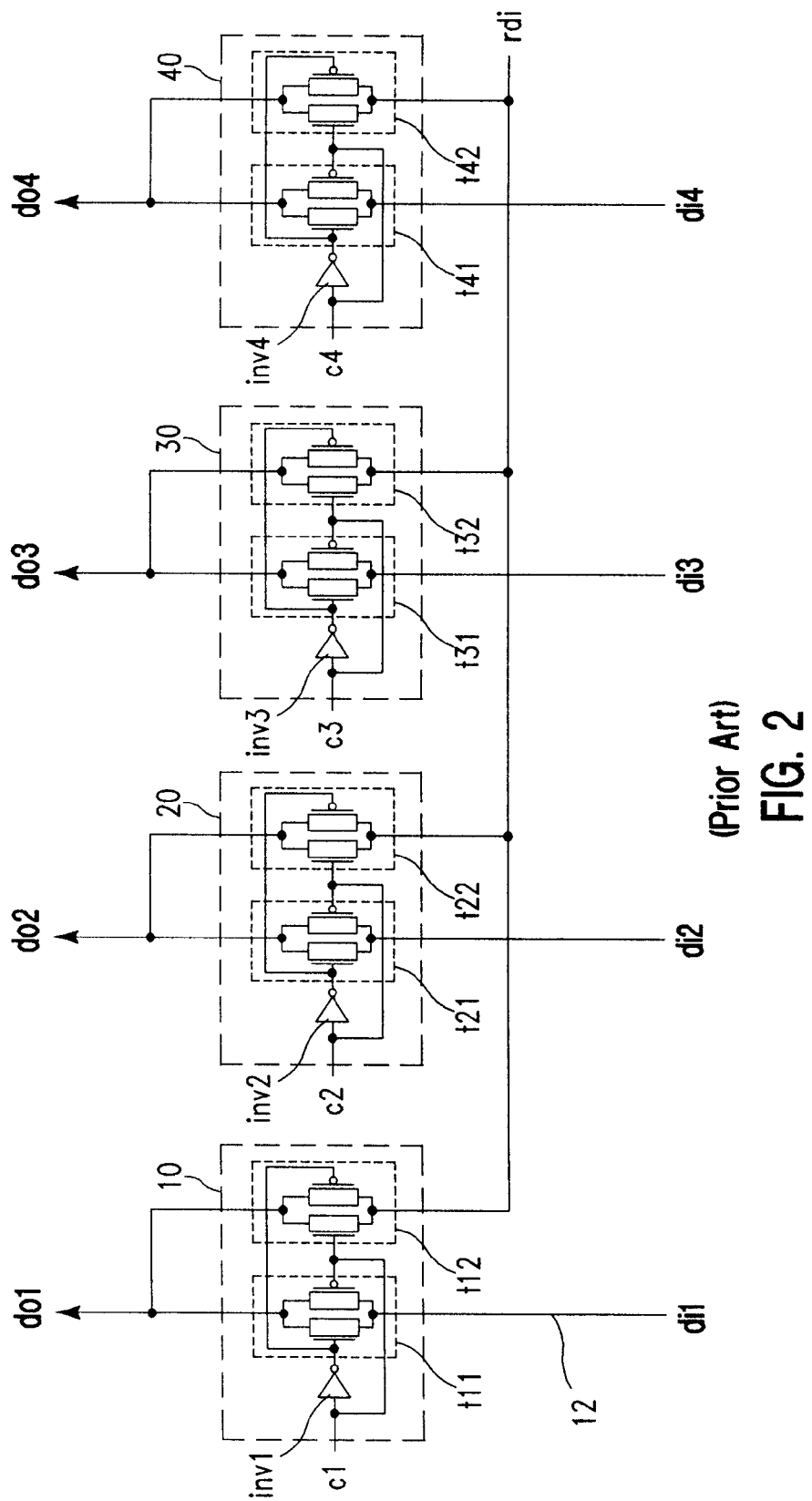
FIG. 2 illustrates a redundancy replacement arrangement according to the prior art.

Fuses have particular characteristics which make them more suitable for use in high-speed data communication circuits than the prior art MOSFET transmission gates described above with respect to FIG. 2. Fuses have properties more similar to ordinary wiring than MOSFETs, such that they tend not to introduce much jitter. In addition, fuses, being metallic and conductive, rather than semi-conductive, tend to have lower capacitance than MOSFETs, since they do not have junction capacitance arising from the junction of different regions of semiconductor material.

A redundancy input signal line rdi is coupled to each of the antifuses af1, af2, af3, and af4 of the connection elements 210-240. The redundancy signal input line rdi is connectable to any of the output signal lines do1 through do4 upon application of appropriate electrical conditions to cause the corresponding antifuse to become conductive.

Like fuses, antifuses also have particular characteristics which make them more suitable for use in high-speed data communication circuits than the prior art MOSFET transmission gates described above with respect to FIG. 2. An antifuse initially presents high impedance (which is highly resistive) to maintain a disconnected or open-circuit condition. After programming, an antifuse presents low impedance to provide a conductive signal path. Antifuses typically include a thin dielectric layer sandwiched between two metal layers. The metal layers each have a relatively small cross-sectional area to permit high current density to be achieved following dielectric breakdown of the antifuse upon application of a sufficiently strong electric field. The metallic construction of the antifuse and its small cross-sectional area results in a connection element having low capacitance. Antifuses have properties more similar to ordinary wiring than MOSFETs, such that they tend not to cause jitter. Like fuses, antifuses do not have junction capacitance as do MOSFETs, since they are metallic and formed of conductive material, rather than semiconductive material.

When all data transmitters of block 130A connected to the data input signal lines di1 through di4 are operational, the unblown fuses f1 through f4 provide conductive paths between input signal lines di1 through di4 and respective output signal lines do1 through do4. On the other hand, when a particular data transmitter is not operational, e.g. the data transmitter connected to input signal line di3, the connection element 230 can be programmed, for example, by an electrical condition such as high voltage or current. For example, an unusually high voltage or current, that is, a voltage or current of three or more times the typical operating voltage or current is applied between the output data signal line do3 and the input data signal line di3 to blow the fuse f3 that normally connects the two signal lines. Also, an unusually high voltage or current of three or more times the typical operating voltage or current is applied between the output data signal line do3 and the redundant input data signal line rdi to place the antifuse af3 in the low impedance state. As a result of programming the connection element, the failing transmitter is disconnected from the output signal line do3, and the redundancy input signal line rdi is connected to the output signal line do3.

In an alternative embodiment, the data input signal lines di1 through di4 are each connected to a data receiver of a plurality of receivers, for example receiver block 130B (FIG. 1). In such embodiment, the redundancy input signal line rdi is connected to a redundancy receiver in place of a redundancy transmitter as described above. In such embodiment, the data output signal lines do1 through do4 are connected to further circuitry which processes the received serial data signals.

In another embodiment of the invention, connections are made and broken between communication devices and signal lines on the integrated circuit through connection elements which include micro-electromechanical (MEM) switches rather than fuses and antifuses. MEM switches, like fuses, are metallic in structure and, therefore, do not suffer from junction capacitance as do the MOSFET transmission gates described above relative to FIG. 2. However, unlike fuses and antifuses, MEM switches are capable of being programmed more than once. In addition, MEM switches provided on integrated circuits are capable of being sized to carry currents and handle voltages which are independent of those used to program the MEM switches.

Figure 4:
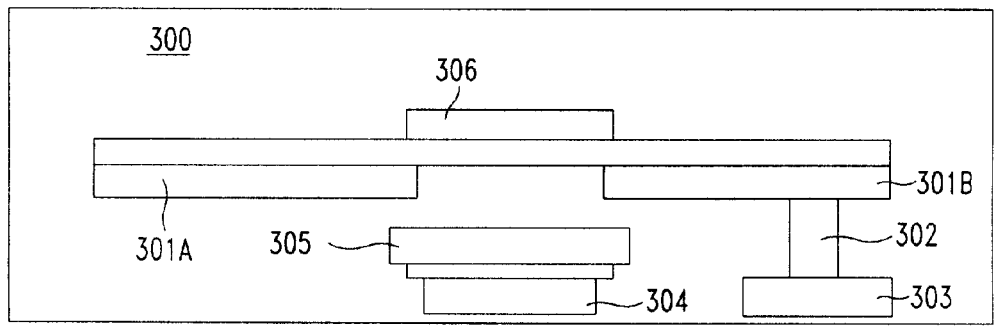
FIG. 4 is a cross-sectional view illustrating an exemplary MEM switch for use in an embodiment of the invention.
Figure 5:
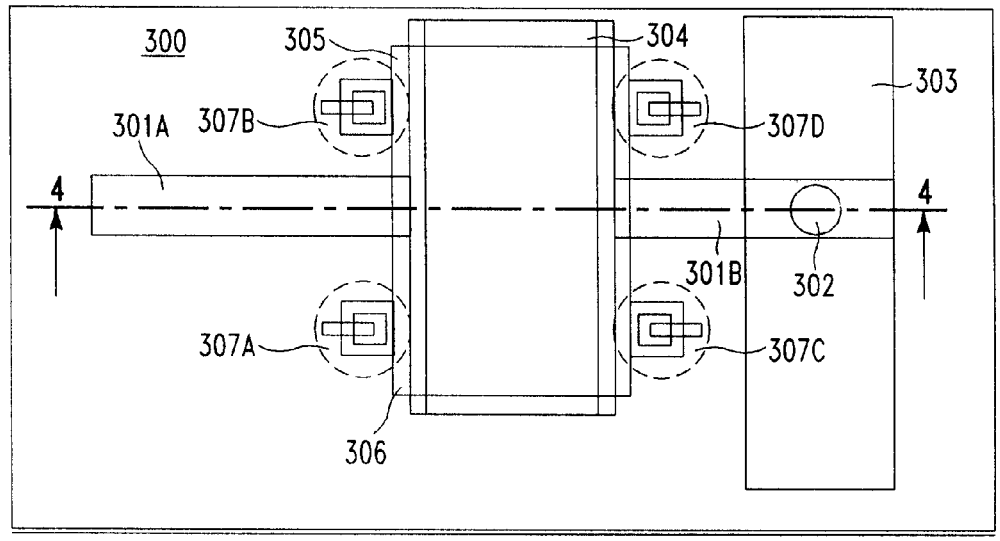
FIG. 5 is a top-down plan view of the MEM switch illustrated in FIG. 4.

MEM switches vary in structure and operating characteristics. For integration into today's advanced integrated circuit technology, it is desirable for the MEM switch to be programmable by low input voltages. The structure and operation of an example of a MEM switch suitable for use in an embodiment of the invention will now be described with reference to FIGS. 4 and 5. Such MEM switch is illustrated by way of example only, as many types of MEM switches are suitable for use according to embodiments of the invention. FIG. 4 is a cross-sectional view illustrating the example MEM switch 300. FIG. 5 is a top-down plan view of the MEM switch 300. The cross-section shown in FIG. 4 is taken through line 4-4 of FIG. 5. As shown in FIGS. 4 and 5, cross-sectional view and top view, respectively, the MEM switch 300 includes a movable switch pad 305, mounted on four hinge brackets 307A-307D for unrestrained motion in the vertical direction. The hinge brackets limit motion in lateral directions, and substantially prevent bending of the switch pad 305 under force. The switch pad 305 moves between an open switch position next to a bottom electrode 304, and a closed switch position next to a top electrode 306 to provide a conductive path between portions 301A, 301B of wiring of an upper wiring level.

Movement of the switch pad 305 is controlled by application of electrostatic Coulomb forces by the bottom and top electrodes 304 and 306 at low voltages. The switch pad 305 is held at the open-circuit rest position near bottom electrode 304 by a Coulomb an electrostatic attractive force produced by applying a negative voltage of about two to three volts DC to bottom electrode 304. At such time, the voltage at the top electrode 306 is held at ground or at a small positive voltage, e.g from one to three volts DC. On the other hand, the switch pad 305 is held at the closed-circuit active position near top electrode 306 by an electrostatic attractive a Coulomb force produced by applying a negative voltage of about two to three volts DC to top electrode 304. When the switch pad 305 is at the closed-circuit active position, the MEM switch 300 conducts, providing a conductive path between wiring portions 301A and 301B, which in turn, conducts to a lower wiring level 303 through conductive via 302.

Figure 6:
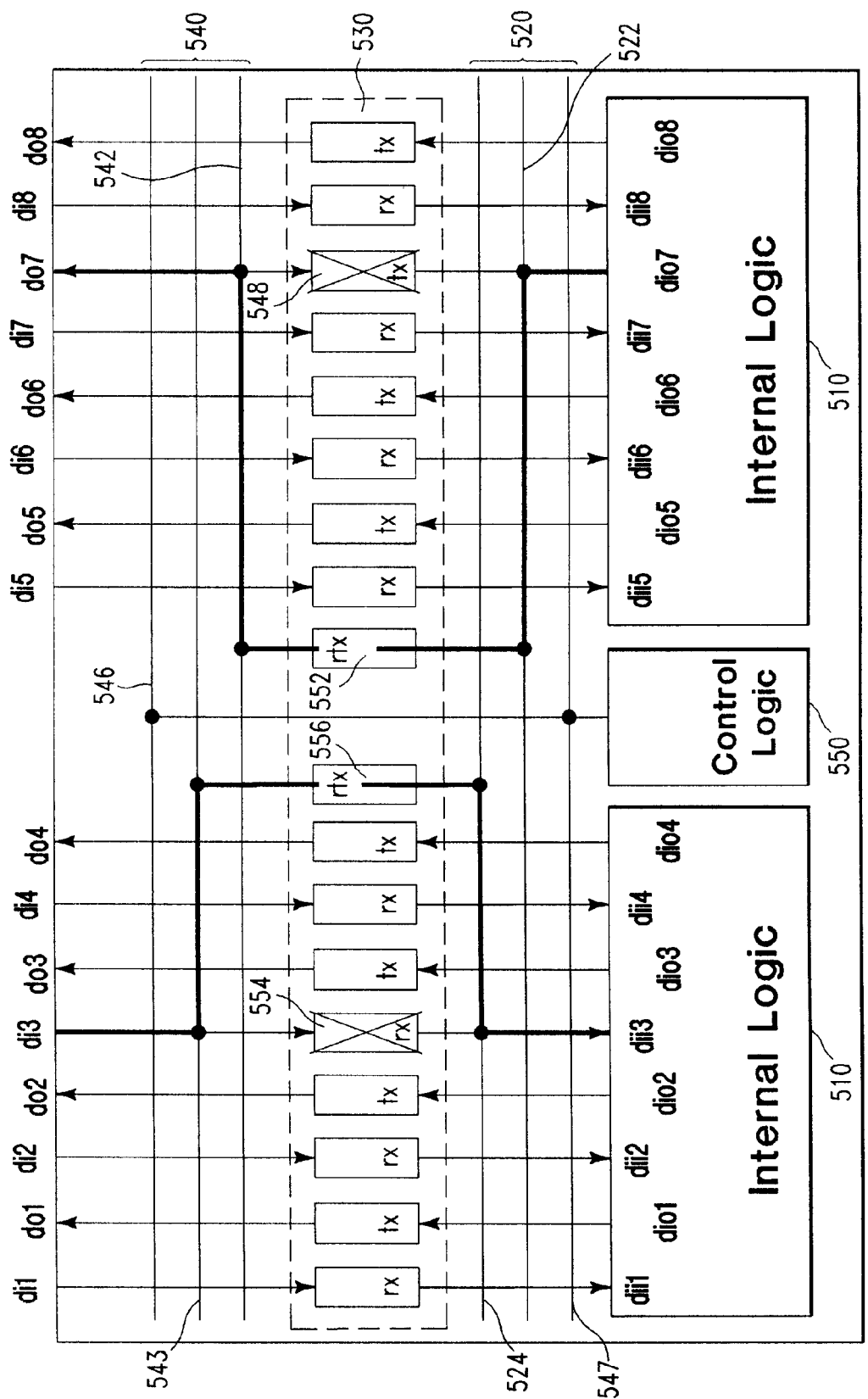
FIG. 6 illustrates an arrangement for interconnecting a plurality of data transmitters and data receivers to input signal lines and output signal lines, according to an embodiment of the invention.

FIG. 6 illustrates an arrangement for interconnecting a plurality of data transmitters (tx) and data receivers (rx) (530) to a plurality of corresponding input signal lines di1 through di8 and output signal lines do1 through do8 of an input output interface, according to an embodiment of the invention. In such arrangement, connection elements preferably including MEM switches 300 are used for interconnecting the data transmitters and data receivers to the input signal lines and the output signal lines, the MEM switches 300 being controlled by signals 546 output from control logic 550.

An arrangement for interconnecting the data transmitters (tx) and data receivers (rx) to a plurality of corresponding input signal lines dii1 through dii8 and output signal lines dio1 through dio8 of internal logic 510 of a chip 500 is also shown in FIG. 6. In such arrangement, connection elements preferably including MEM switches 300 are used for interconnecting the data transmitters and data receivers to the input signal lines and the output signal lines of the internal logic 510, the MEM switches 300 being controlled by signals 547 output from control logic 550.

FIG. 6 illustrates a condition in which a particular transmitter 548 is removed from the configuration as failing, and the redundancy transmitter 552 is connected in its place. As particularly shown in FIG. 6, a selected data output signal line do7 is connected through a redundancy transmitter signal line 542 to a redundancy transmitter 552 in place of transmitter 548. A selected internal data interface signal line dio7 of internal logic 510 is also connected through another redundancy transmitter signal line 522 to the redundancy transmitter 552, in place of transmitter 548.

Likewise, as further shown in FIG. 6, a receiver 554 of the group of receivers is taken out of the configuration as failing and a redundancy receiver 556 is used in its place. In such case, control logic 550 provides signals onto control signal bus 546 for controlling MEM switches 300 at the interconnection point between the receiver redundancy signal line 542 and the failing receiver 554. A selected internal data interface signal line dii3 of internal logic 510 is also connected through another redundancy receiver signal line 524 to the redundancy receiver 556 in place of receiver 554.

Thus, connection elements in the form of MEM switches are used to select one of many data signal output lines do1 do8 for interconnection to a redundancy transmitter in place of a default transmitter, and other connection elements in the form of MEM switches are used to select one of many data source output lines dio1 dio8 for interconnection to a redundancy transmitter in place of a default transmitter. Moreover, corresponding capabilities are provided for interconnecting a redundancy receiver in place of a default receiver.

Figure 7:
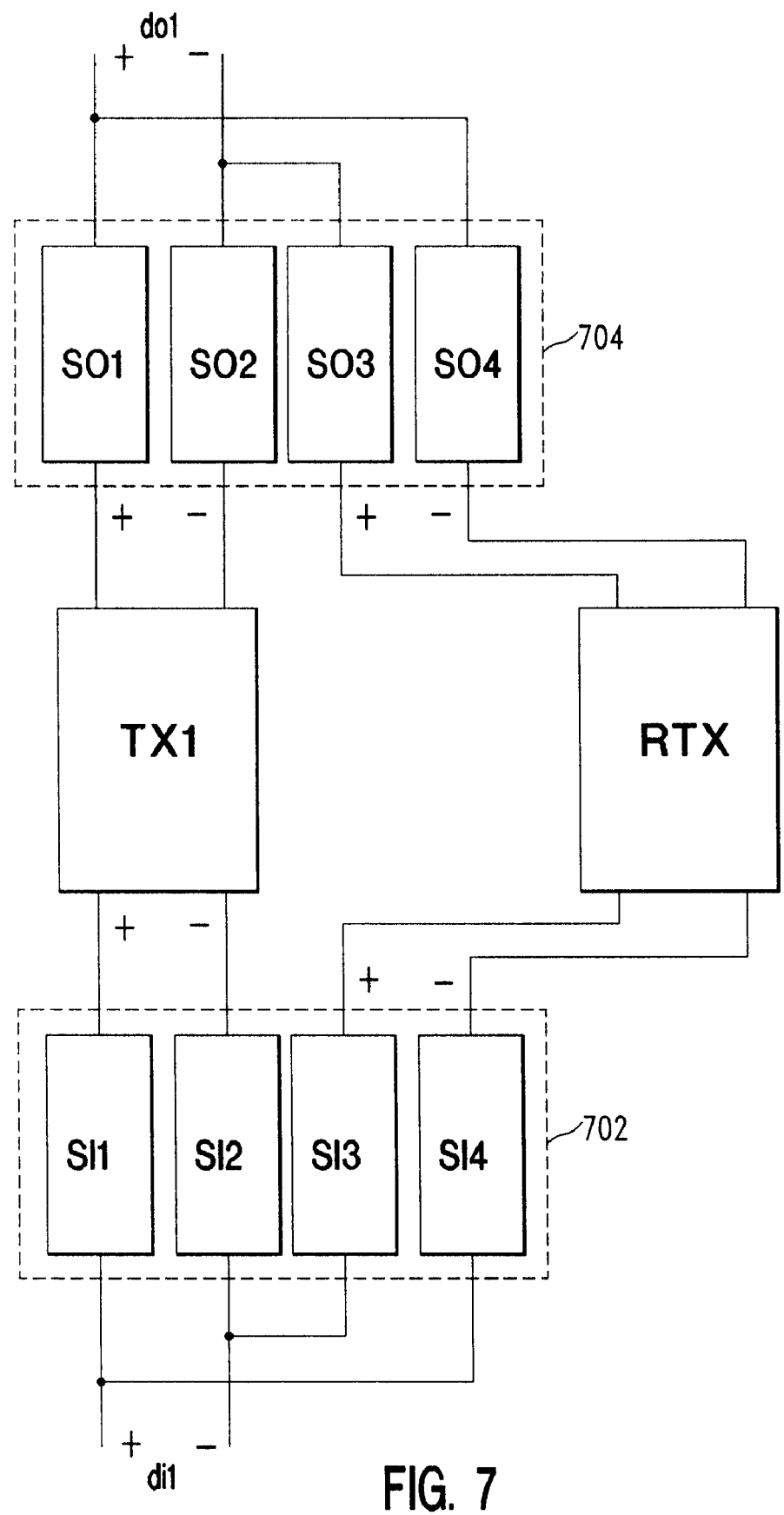
FIG. 7 is a detailed illustration of an interconnection arrangement according to a preferred embodiment of the invention.

FIG. 7 is a detailed illustration of an interconnection arrangement according to a preferred embodiment of the invention. As illustrated in FIG. 7, differential signaling is provided at the input and at the output of a transmitter TX1. The transmitter TX1 is connected by a connection element 702 to an input signal line di1 having a pair of differential signal conductors, as indicated by the positive and negative symbols (+,). The differential input lines carry a differential pair of signals that swing in opposite directions at signal transitions.

The transmitter TX1 is also connected by another connection element 704 to an output signal line do1 having a pair of differential signal conductors, as indicated by the positive and negative symbols (+, −). The differential output lines also carry a differential pair of signals that swing in opposite directions at signal transitions.

Each connection element 702 and 704 connects to a redundancy transmitter RTX by way of pairs of differential conductors indicated by the positive and negative symbols (+, −). Within each connection element four switch elements are provided. Connection element 702 includes four switch elements SI1 through SI4 and connection element 704 includes four switch elements SO1 through SO4.

In a particular embodiment, the switch elements SI1-SI2 and SO1-SO2 are each implemented by a fuse, and the switch elements SI3-SI4 and SO3-SO4 are each implemented by an antifuse. In such case, each connection element 702 and 704 operates in a manner like any one of the connection elements

210-240 described above with respect to FIG. 3, except that each connection element 702 and each connection element 704 has two fuses and two antifuses, one fuse per each differential conductor of each signal line, and one antifuse per each differential conductor that connects to the redundancy data transmitter. If there is a failure of the transmitter TX1, the fuses SI1-SI2 and SO1-SO2 are changed to the disconnected (high impedance, or "open") position, while the antifuses SI3-SI4 and SO3-SO4 are changed to the connected (low impedance, or "closed") position. In such manner, the default data transmitter TX1 is disconnected from the circuit, and the redundancy data transmitter RTX is connected to the circuit in its place.

In another particular embodiment, the switch elements SI1-SI2 and SO1-SO2 are each implemented by a MEM switch, such as the example MEM switch 300 shown and described above with respect to FIGS. 4 and 5. In such case, MEM switches SI1-SI2 and SO1-SO2 normally connect the differential signal conductors at the input and the output of the transmitter TX1 to the input signal line di1 and the output signal line do1, respectively. MEM switches SI3-SI4 and SO3-SO4 normally leave the differential signal conductors at the input and at the output of the redundancy transmitter RTX disconnected from the input signal line di1 and the output signal line do1, respectively. If there is a failure of the transmitter TX1, the MEM switches SI1-SI2 and SO1-SO2 are switched to the disconnected (high impedance, or "open") position, while the switches SI3-SI4 and SO3-SO4 are switched to the connected (low impedance, or "closed") position. In such manner, the default data transmitter TX1 is disconnected from the circuit, and the redundancy data transmitter RTX is connected to the circuit in its place.

As described in the foregoing, integrated circuits and methods are provided according to embodiments of the invention in which a plurality of high-speed data transmitters are each connected to an input signal line and an output signal line by connection elements such as fuses and MEM switches which have a low impedance connecting state, the connection elements capable of being altered to a high impedance disconnecting state to disconnect a failing one of the transmitters. At the same time, a redundancy transmitter is connected in place of the failing transmitter by altering other connection elements from a high impedance, disconnecting state to a low impedance, connecting state.

While the invention has been described in accordance with certain preferred embodiments thereof, those skilled in the art will understand the many modifications and enhancements which can be made thereto without departing from the true scope and spirit of the invention, which is limited only by the claims appended below.

The invention claimed is:

1. An apparatus, comprising:
an integrated circuit, an individual one of said integrated circuit having incorporated therein
a plurality of output signal lines including a first output signal line;
a plurality of data transmitters including a plurality of default data transmitters and at least one redundancy data transmitter, each of said plurality of data transmitters being operable to transmit a data communication signal at a signal switching frequency above about 500 megahertz; and
a plurality of first connection elements each including a fuse having an electrically conductive state and an electrically high resistive state and an antifuse having an electrically high resistive state and an electrically conductive state, said fuse of a given first connection element of said plurality of first connection elements conductively connecting a first default data transmitter of said plurality of default data transmitters to said first output signal line when said fuse of said given first connection element is in said electrically conductive state and said fuse of said given first connection element electrically disconnecting said first default data transmitter from said first output signal line when said fuse of said given first connection element is in said electrically high resistive state, such that when said first default data transmitter is connected to said first output signal line said first default data transmitter is operable to transmit said data communication signal through said fuse of said given first connection element over said first output signal line, said antifuse of said given first connection element electrically disconnecting said redundancy data transmitter from said first output signal line when said antifuse of said given first connection element is in said electrically high resistive state and said antifuse of said given first connection element conductively connecting said redundancy data transmitter to said first output signal line when said antifuse of said given first connection element is in said electrically conductive state, such that when said redundancy data transmitter is connected to said first output signal line said first redundancy data transmitter is operable to transmit said data communication signal through said antifuse of said given first connection element onto said first output signal line.

2. The apparatus of claim 1, further comprising a plurality of second connection elements, each including a second fuse having an electrically conductive state and an electrically high resistive state, said second fuse of a given second connection element of said plurality of second connection elements conductively connecting said first default data transmitter to a first input signal line when said second fuse of said given second connection element is in said electrically conductive state and said second fuse of said given second connection element electrically disconnecting said first default data transmitter from said first input signal line when said second fuse of said given second connection element is in said electrically high resistive state, each of said second connection elements further including a second antifuse having an electrically high resistive state and an electrically conductive state, said second antifuse of said given second connection element electrically disconnecting said redundancy data transmitter from said first input signal line when said second antifuse of said given second connection element is in said electrically high resistive state and said second antifuse of said given second connection element conductively connecting said redundancy data transmitter to said first input signal line when said second antifuse of said given second connection element is in said electrically conductive state.

3. The apparatus of claim 2 wherein each of said default data transmitters provides a pair of differential signal outputs and receives a pair of differential signal inputs, such that said first output signal line includes a pair of differential signal conductors for receiving said differential signal outputs and said first input signal line includes a pair of differential signal conductors for providing said differential signal inputs.

4. An apparatus, comprising:
an integrated circuit, an individual one of said integrated circuit having incorporated therein
a plurality of output signal lines including a first output signal line;

a plurality of input signal lines including a first input signal line;

a plurality of data transmitters including a plurality of default data transmitters and at least one redundancy data transmitter, each of said plurality of data transmitters being operable to transmit a data communication signal at a signal switching frequency above about 500 megahertz; and a plurality of first connection elements each including a first fuse having an electrically conductive state and an electrically high resistive state, said first fuse of a given first connection element of said plurality of first connection elements conductively connecting a first default data transmitter of said plurality of default data transmitters to said first output signal line when said first fuse of said given first connection element is in said electrically conductive state and said first fuse of said given first connection element electrically disconnecting said first default data transmitter from said first output signal line when said first fuse of said given first connection element is in said electrically high resistive state, such that when said first default data transmitter is connected to said first output signal line said first default data transmitter is operable to transmit said data communication signal through said first fuse of said given first connection element onto said first output signal line; and a plurality of second connection elements each including a second fuse having an electrically conductive state and an electrically high resistive state, said second fuse of a given second connection element of said plurality of second connection elements conductively connecting said first default data transmitter to said first input signal line when said second fuse of said given second connection element is in said electrically conductive state and said second fuse of said given second connection element electrically disconnecting said first default data transmitter from said first input signal line when said second fuse of said given second connection element is in said electrically high resistive state.

5. The apparatus of claim 4 wherein each of said first connection elements further includes a first antifuse and each of said second connection elements further includes a second antifuse, wherein said first antifuse of said given first connection element conductively connects said redundancy data transmitter to said first output signal line when said first antifuse of said given first connection element is in a low impedance state and said first antifuse of said given first connection element electrically disconnects said redundancy data transmitter from said first output signal line when said first antifuse of said given first connection element is in a high impedance state and said second antifuse of said given second connection element conductively connects said redundancy data transmitter to said first input signal line when said second antifuse of said given second connection element is in said low impedance state and said second antifuse of said given second connection element electrically disconnects said redundancy data transmitter from said first input signal line when said second antifuse of said given second connection element is in said high impedance state.

6. An apparatus, comprising:

an integrated circuit, an individual one of said integrated circuit having incorporated therein a plurality of output signal lines including a first output signal line;

a plurality of input signal lines including a first input signal line;

a plurality of data transmitters including a plurality of default data transmitters and at least one redundancy data transmitter, each of said plurality of data transmitters being operable to transmit a data communication signal at a signal switching frequency above about 500 megahertz; and a plurality of first connection elements each including a first MEM switch having an electrically conductive state and an electrically high resistive state, said first MEM switch of a given first connection element of said plurality of first connection elements conductively connecting a first default data transmitter of said plurality of default data transmitters to said first output signal line when said first MEM switch of said given first connection element is in said electrically conductive state and said first MEM switch of said given first connection element electrically disconnecting said first default data transmitter from said first output signal line when said first MEM switch of said given first connection element is in said electrically high resistive state, such that when said first default data transmitter is connected to said first output signal line said first default data transmitter is operable to transmit said data communication signal through said MEM switch of said given first connection element onto said first output signal line; and a plurality of second connection elements each including a second MEM switch having an electrically conductive state and an electrically high resistive state, said second MEM switch of a given second connection element of said plurality of second connection elements conductively connecting said first default data transmitter to said first input signal line when said second MEM switch of said given second connection element is in said electrically conductive state and said second MEM switch of said given second connection element electrically disconnecting said first default data transmitter from said first input signal line when said second MEM switch of said given second connection element is in said electrically high resistive state.

7. The apparatus of claim 6 wherein said first and second MEM switches of said given first and second connection elements include MEM switches of the type having a signal pad restrained by a plurality of hinge brackets for movement in a substantially vertical direction in response to electrostatic force to switch between a connecting state and a disconnecting state.

* * * * *